(12) United States Patent
Johnstone et al.

(10) Patent No.: US 8,787,911 B2
(45) Date of Patent: Jul. 22, 2014

(54) LOAD BALANCING IN A MOBILE COMMUNICATION NETWORK

(75) Inventors: Justin Gordon Johnstone, Somerset (GB); Andrea Giustina, Milan (IT)

(73) Assignee: Ubiquisys Limited, Swindon (GB)

( * ) Notice: Subject to any disclaimer, the term of this patent is extended or adjusted under 35 U.S.C. 154(b) by 265 days.

(21) Appl. No.: 12/821,006

(22) Filed: Jun. 22, 2010

(65) Prior Publication Data

US 2011/0039564 A1 Feb. 17, 2011

(30) Foreign Application Priority Data

Aug. 11, 2009 (GB) .................................. 0914018.7

(51) Int. Cl.
*H04W 36/00* (2009.01)
*H04W 4/00* (2009.01)
*H04B 7/00* (2006.01)
*H04W 28/08* (2009.01)
*H04W 36/22* (2009.01)

(52) U.S. Cl.
USPC ........ 455/436; 455/435.2; 455/442; 455/434; 455/525; 370/338; 370/238; 370/229

(58) Field of Classification Search
USPC ......................................................... 455/436
See application file for complete search history.

(56) References Cited

U.S. PATENT DOCUMENTS

| | | | |
|---|---|---|---|
| 4,670,899 A | 6/1987 | Brody | |
| 6,574,474 B1 | 6/2003 | Nielsen | |
| 8,014,355 B2 | 9/2011 | Koga | |
| 2003/0220108 A1 | 11/2003 | Kojima et al. | |
| 2004/0001467 A1* | 1/2004 | Cromer et al. | ................ 370/338 |
| 2004/0121777 A1 | 6/2004 | Schwarz et al. | |
| 2006/0251104 A1 | 11/2006 | Koga | |
| 2007/0177501 A1 | 8/2007 | Papasakellariou | |
| 2007/0177510 A1* | 8/2007 | Natarajan et al. | ............. 370/238 |
| 2007/0225012 A1* | 9/2007 | Chang et al. | ................ 455/452.2 |
| 2008/0261602 A1 | 10/2008 | Livneh | |
| 2010/0151858 A1* | 6/2010 | Brisebois et al. | ............. 455/434 |
| 2012/0009972 A1* | 1/2012 | Viering et al. | ................ 455/525 |

FOREIGN PATENT DOCUMENTS

| | | |
|---|---|---|
| GB | 2414899 | 12/2005 |
| JP | 2002034069 | 1/2002 |
| JP | 2006287426 | 10/2006 |
| WO | WO94/05130 | 3/1994 |

OTHER PUBLICATIONS

PCT International Search Report and Written Opinion dated Oct. 18, 2010 issued in PCT/GB2010/050694.

(Continued)

*Primary Examiner* — Timothy Pham
(74) *Attorney, Agent, or Firm* — Weaver Austin Villeneuve & Sampson LLP

(57) ABSTRACT

A cellular access point, amongst a plurality of interconnected cellular access points receives from a first user equipment a connection attempt that would cause the access point to exceed a first predetermined capacity threshold. The cellular access point selects one of the previously connected user equipments and an associated one of the plurality of interconnected cellular access points. The cellular access point initiates a handover of the selected one of the previously connected user equipments to the associated one of the plurality of interconnected cellular access points and establishes a connection with the first user equipment.

29 Claims, 6 Drawing Sheets

(56) References Cited

OTHER PUBLICATIONS

Kyriazakos, S. et al., "Enhanced Capacity Management for $2^{nd}$ and $3^{rd}$ Generation Cellular Networks," VTC 2000-Fall, IEEE VTS $52^{nd}$ Vehicular Technology Conference, Sep. 24, 2000, pp. 2701-2705.

UK Intellectual Property Office Search Report dated Nov. 3, 2009 issued in GB0914018.7.

UK Combined Search and Examination Report dated Jul. 25, 2012, Application No. GB1203226.4.

EP Office Action dated Mar. 1, 2013 for EP Application No. 10725833.7.

JP Office Action dated Nov. 29, 2013 for JP Application No. 2012-524281.

CN Office Action dated Mar. 24, 2014 for CN Application No. 201080035645.9.

* cited by examiner om the core network of the cellular communication network. Thus, user devices, such as mobile phones 14, laptop computers and the like, that are in the vicinity of the building 10 can obtain a cellular service by establishing a connection into the cellular network through the macrocell base station 12.

However, it is known that cellular coverage within buildings can be poor, leading to unavailability of service, or forcing user devices to transmit signals at high transmit powers, leading to shorter battery life.

Femtocell access points are therefore deployed within the building 10, with the intention that user devices located within the building at least should be able to obtain a cellular service by establishing a connection into the cellular network through one of the femtocell access points.

Although the invention is described herein with reference to the deployment of femtocell access points within a building, within which users are expected to circulate, such as an office building, an educational establishment, or a shopping mall, it will be apparent that the invention is applicable to other situations. For example, the invention is equally applicable to outdoor deployment of femtocell access points, especially but not exclusively in locations where there is common ownership and/or management of an area in which users are expected to circulate.

Figure 1:
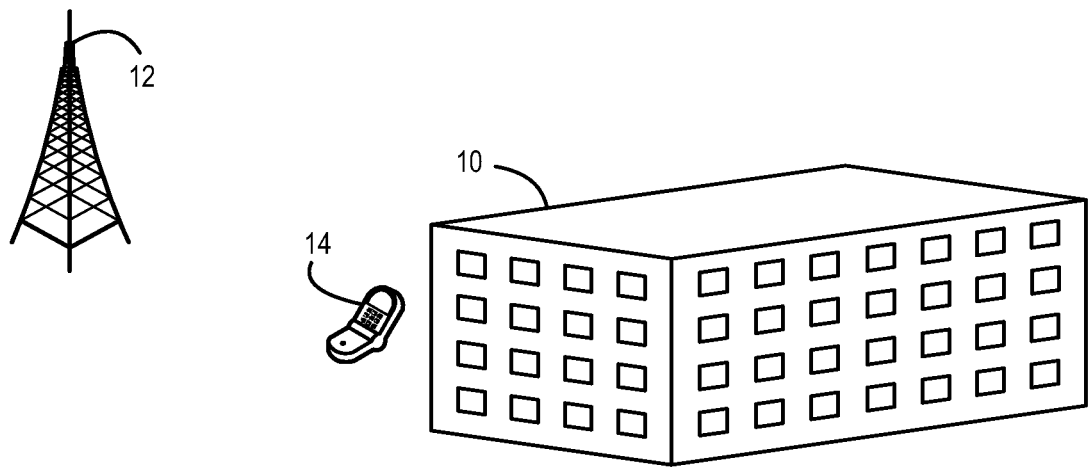
Figure 2:
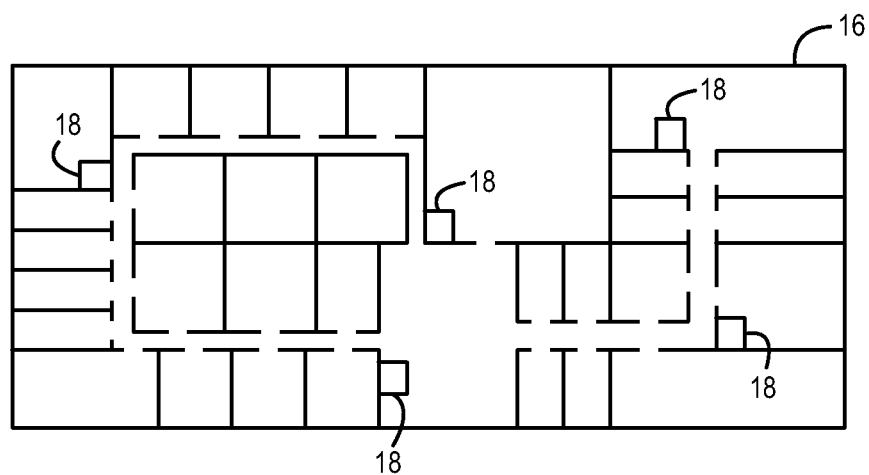

FIG. 2 is a schematic representation of one level 16 within the interior of the building 10. In this example, the building 10 is an office building, and the whole of the level 16 is occupied by a single corporate entity. Based on the number of expected users within the level 16 at any one time, a suitable number of femtocell access points 18 are deployed. In the case of a corporate deployment such as this, the femtocell access points 18 may be configured such that only registered user devices may access the cellular network through one of the femtocell access points, and in this case the number of active users at any one time may be somewhat predictable. In a deployment where any user device that is active in the cellular network may access the network through one of the femtocell access points, the number of active users at any one time may be more difficult to predict with any accuracy.

The femtocell access points 18 are located in suitable positions. For example, it may be appropriate to provide a femtocell access point close to the or each entrance/exit point, so that users entering or leaving the building can spend as long as possible connected to one of the femtocell access points. In addition, the femtocell access points should be distributed throughout the space, so that any user within the space will be able to establish a connection with one of the femtocell access points.

Figure 3:
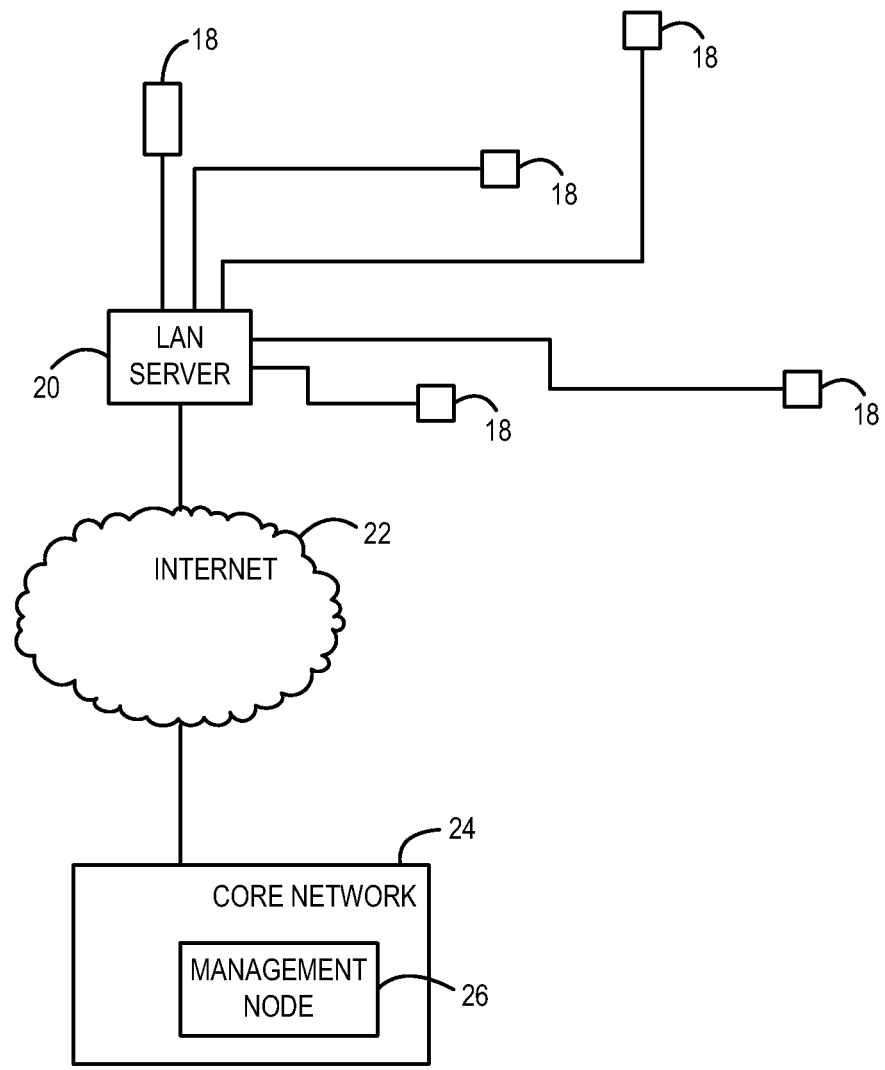

FIG. 3 is a schematic diagram, illustrating network connections of the femtocell access points. Specifically, the femtocell access points 18 in a group are all connected to a local area network (LAN) having a LAN server 20, which also has a connection to a wide area network 22, in particular a public wide area network such as the internet. The femtocell access points 18 are able to connect over the wide area network 22 to a core network 24 of the cellular communications network. The core network 24 includes a management node 26, which monitors and controls where necessary the operation of the femtocell access points 18.

In order to deal with the situation where one of the femtocell access points 18 may become overloaded, one option is for that femtocell access point to arrange for one of its existing calls to be handed over to another of the femtocell access points. This can be based on information obtained when the potentially overloading connection request is received or on information that has previously been obtained, or on a combination of previously obtained information and information obtained when the potentially overloading connection request is received.

In one embodiment of the invention, the management node 26 distributes to all femtocell access points 18 in the group the relevant information about the group, including: the IDs of all femtocell access points in the group; and their main RF parameters, such as the UTRA Absolute RF Channel Number (UARFCN) and scrambling code (SC), the Location Area Code (LAC) and Cell-ID, and the initial power levels.

The femtocell access point can enter the downlink monitor mode, in which it can detect signals transmitted by other femtocell access points, to capture the identities of the neighbouring femtocell access points. Thus, by matching the detected UARFCN/SC and LAC/Cell-ID transmitted by each femtocell access point with the information received from the management node 26, the femtocell access point 18 is able to populate automatically the neighbour table. This can then be used in the case of handovers for local mobility, in a generally conventional way, and for the purposes of load balancing as described in more detail below.

Thus, mobility within the group is fully supported. Cell-reselection with other femtocell access points is achieved by each broadcasting the relevant carrier and scrambling code information. Handover from one femtocell access point to another can be achieved because each femtocell access point has a full map of its neighbour femtocell access points, including their IDs, and so it can send a handover command that is unequivocally pointing to a specific femtocell access point. Full support is provided for circuit-switched (CS), packet-switched (PS) and multiple Radio Access Bearer (Multi-RAB) call mobility, and for intra-frequency and inter-frequency handovers between femtocell access points.

In addition, each femtocell access point receives periodic measurement reports from its connected user equipments, with these reports indicating the signal strengths of intra-frequency neighbouring femtocell access points. Further, each femtocell access point sends measurement control messages to its connected user equipments that are operating in compressed mode, requiring them to provide periodic measurements of their inter-frequency neighbouring femtocell access points.

Figure 4:
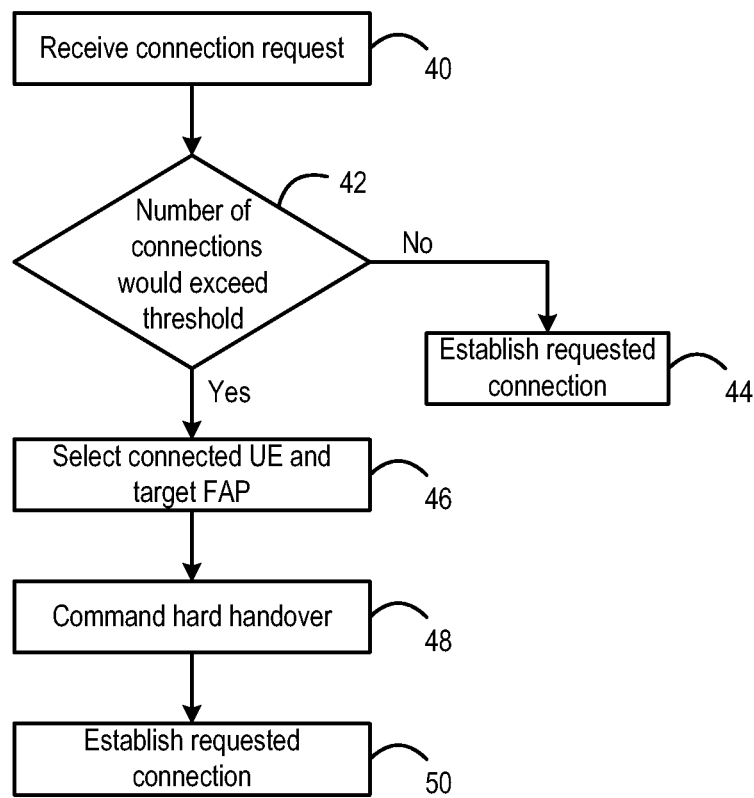

FIG. 4 is a flow chart illustrating in general terms the procedure that is followed in a femtocell access point when a new connection request is received from a user equipment.

In step 40, the femtocell access point (FAP) receives a connection request from a requesting user equipment (UE), and in step 42 it is determined whether this connection request would cause the number of connected UEs to exceed a threshold. This threshold may be equal to the capacity of the femtocell access point, in which case the requested connection cannot be established without exceeding that capacity. Alternatively, a threshold lower than the capacity may be established. For example, when the femtocell access point can handle eight simultaneous calls, it may be determined in step 42 whether the connection request would be the eighth connection.

If it is determined in step 42 that the threshold number of calls has not been reached, the procedure passes to step 44, and the connection is established in the conventional way.

However, if it is determined in step 42 that the threshold number of calls has not been reached, the procedure passes to step 46. In step 46, one of the connected UEs and an associated target FAP from the same group are selected. These selections can be made in different ways, as will be described in more detail below.

In step 48, a command is sent to the selected connected UE, causing it to handover to the selected target FAP. Thereafter, in step 50, the requested connection with the requesting UE is established in the conventional way.

As mentioned above, in step 46, one of the connected UEs and an associated target FAP from the same group are selected, so that a handover command may be sent to that UE, thereby allowing the femtocell access point to accept the new connection request. Of course, it is not generally possible to select the UE and the target femtocell access point independently of each other, because it is necessary to select a UE that is likely to be able to handover successfully to the target femtocell access point, but the selection can be made by looking first at the UE to be handed over, or by looking first at the target femtocell access point.

There are many ways in which the selection of a UE can be made, and the selection criteria of the femtocell access point may vary according to configurable rules. This configurable approach allows flexible, extensible selection criteria to be determined and customized to suit an individual operator's preferences and achieve an optimized performance in their specific network.

The selection can be made on the basis of specified criteria, and configurable selection rules can be achieved by various means, including, but not limited to, the following examples: configuring prioritization of certain criteria over others; and configuring different weighting values to each criterion.

When weighting values are given to each criterion, the weighted results are evaluated and combined to determine that UE's overall selection rating. The femtocell access point then selects the highest ranked UE as the next UE candidate for a handover.

One possible selection criterion is the UE's current service resource consumption or demands (for example, whether it is on a voice call, a video call, a packet-switched only call, or a multi-RAB call). As mentioned, the weighting or priority of these services may vary, but one possible example of prioritization would be to give the highest priority, or weight, to voice calls, then video calls, then packet-switched only calls, then multi-RAB calls. This might be appropriate because the services highest ranked are those which consume the least resources. As a result, these will be more likely, on average, to be accepted by the target femtocell access point. Lower ranked services are those that consume more resources, which, by contrast, suffer a lower probability, on average, of being accepted for handin by the target femtocell access point.

Another possible selection criterion is the signal quality of other candidate femtocell access point neighbours as measured by that UE. Another possible selection criterion is the cell loading (if known) of candidate target femtocell access points associated with each candidate UE Similarly, there are many ways in which the selection of a target femtocell access point can be made, and selection criteria used by a femtocell access point to select another of the femtocell access points as a target may vary according to configurable rules. Again, this configurable approach allows flexible, extensible selection criteria to be determined and customized to suit an individual operator's preferences and achieve an optimized performance in their specific network.

Configurable selection rules can be achieved by using various criteria.

For example, the selection can be made by examining the current cell loading of each candidate target femtocell access point. For example, it is possible to exclude a target femtocell access point as a candidate for handover if that femtocell access point is already congested. Prioritising the selection of a less loaded femtocell access point as the target over a more highly loaded femtocell access point allows the total load to be spread more equally over the femtocell access points of the group. This helps to avoid the case where the highest ranked femtocell access point target often becomes congested, while there are other good target candidates that remain underutilized.

In order to be able to use this criterion, the source femtocell access point needs to obtain information about the current cell loading on the various candidate targets. This can be achieved by peer-to-peer communications between femtocell access points over the local area network, whereby each femtocell access point communicates relevant information (for example by broadcast or other means) to other femtocell access points in the group. For example, each femtocell access point may send a notification indicating when its congestion level crosses a preset threshold, or one of several preset threshold, such as when the resource utilization exceeds x %, or drops below y %. In a refinement of this method, each femtocell access point may supply independent indications of its resource utilization in the packet-switched and circuit-switched domains, since this allows more flexible choice of target femtocell access point selection, because a target femtocell access point may be congested in one domain but have resources available in the other domain.

As an alternative, a source femtocell access point can obtain information about one or more potential target femtocell access points, to allow the source device to have an instantaneous and accurate view of each target's current loading, and therefore its suitability as the selected target femtocell access point.

In addition, or as an alternative, the source femtocell access point can use as a selection criterion its history of previous handover success rates to each candidate target femtocell access point. Where a source femtocell access point has previously been successful in handing over a connected UE to a particular target femtocell access point, that device can be ranked more highly as a potential target for future handovers. In order to use this factor, the femtocell access point needs to monitor the success rates of the handovers that it commands, so that the information is maintained and updated over time to ensure that it remains a valid indication of current status.

In some situations, some of the candidate target femtocell access points may have Access Control Lists, i.e. candidate UEs may or may not be allowed access onto the candidate target femtocell access points; where a UE is not permitted access to a particular femtocell access point, the source femtocell access point can eliminate that femtocell access point as a target candidate for that UE.

Figure 5:
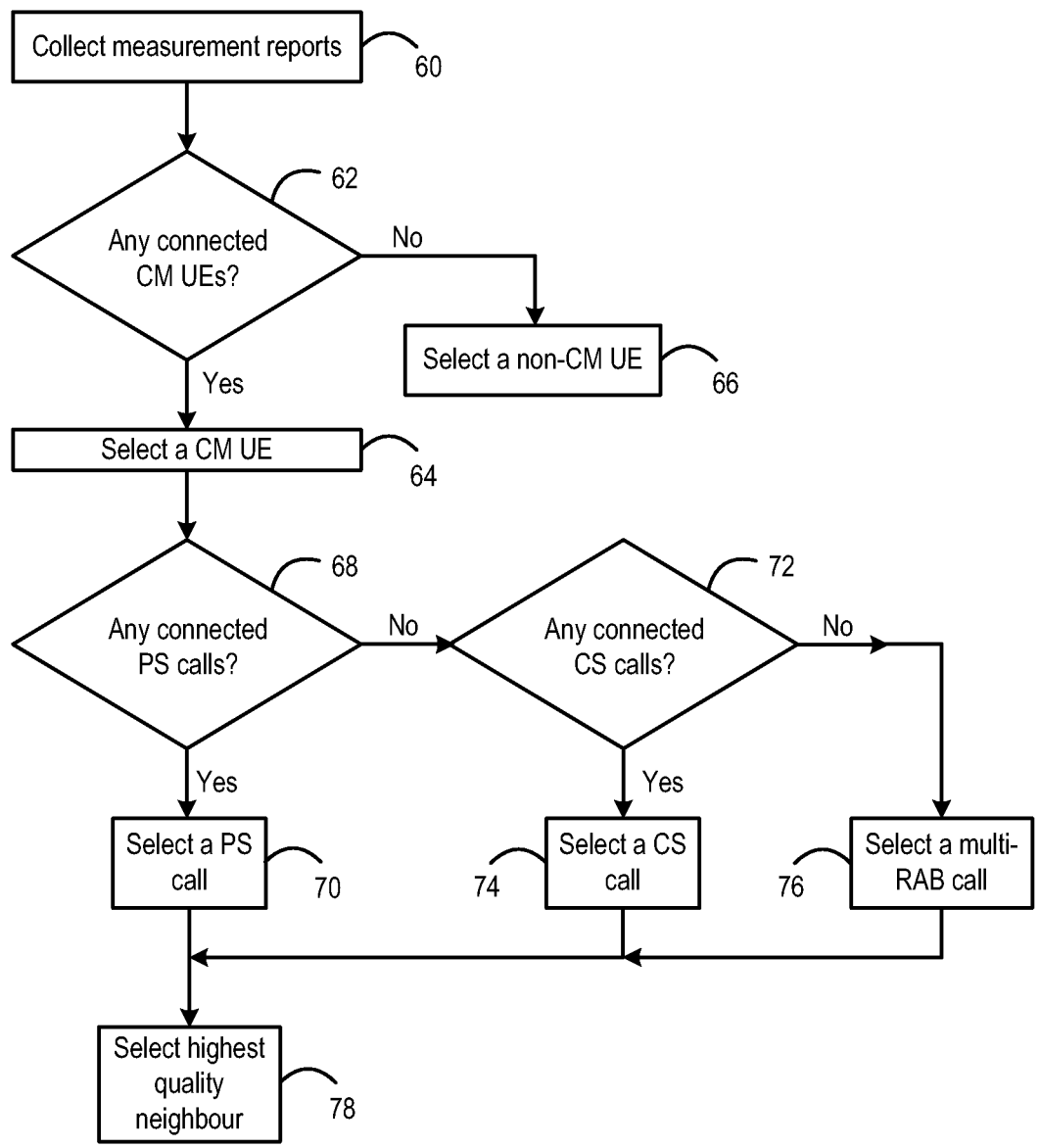

FIG. 5 is a flow chart, illustrating one more specific method to be used in a femtocell access point for selecting a connected UE and a target femtocell access point to be used for a handover, in order to create sufficient capacity in that femtocell access point to be able to allow a new connection request.

In step 60, the femtocell access point collects measurement reports from its connected UEs. More specifically, the femtocell access point collects measurement reports from connected UEs relating to intra-frequency neighbours, and sends measurement control messages to connected UEs that are in connected mode to provide periodic measurement reports relating to inter-frequency neighbours. These measurement reports are then sorted into lists, as described in more detail below.

The process of FIG. 5 is then performed in the event that the femtocell access point receives a connection request that it is unable to fulfill, because this would cause it to exceed its capacity. In step 62, it is determined whether the femtocell access point has any connected UEs in compressed mode (CM). If so, the process continues in step 64 by examining the lists containing measurement reports relating to the CM UEs. If there are no connected UEs in compressed mode (CM), the process continues in step 66 by examining the lists containing measurement reports relating to the non-CM UEs.

It is then determined in step 68 whether the selected list contains any UEs that are in packet-switched calls. If so, the process passes to step 70, in which the list of relevant UEs that are in packet-switched calls is considered further. If not, the process passes to step 72, in which it is determined whether the selected list contains any UEs that are in circuit-switched calls. If so, the process passes to step 74, in which the list of relevant UEs that are in circuit-switched calls is considered further. If not, i.e. if the selected list contains only UEs that are in multi-RAB calls, the process passes to step 76, in which the list of relevant UEs that are in multi-RAB calls is considered further.

In step 78, one of the UEs from the selected list is selected. Specifically, the UE that has reported the highest quality neighbour (which may be an inter-frequency neighbour in the case of a connected mode UE, or may be an intra-frequency neighbour in the case of a non-connected mode UE) is selected for handover, and that neighbour is selected as the target femtocell access point.

If the handover attempt that is made on the basis of the process shown in FIG. 5 is unsuccessful, in the sense that the handover cannot be completed within a preset time, indicating that the target femtocell access point was wrongly chosen, then the process of FIG. 5 is repeated to select an alternative target femtocell access point and associated UE. In this repeat, the selection process of FIG. 5 is performed ignoring the report relating to the highest quality Primary Scrambling Code reported by the UE selected in the first selection. That is, the repeated selection may result in the selection of a different UE and its highest quality neighbour femtocell access point, or it may result in the selection of the same UE and a different femtocell access point, i.e. its next highest quality neighbour.

If, alternatively, the handover attempt that is made on the basis of the process shown in FIG. 5 is unsuccessful, because the target femtocell access point handover was congested, the process of FIG. 5 is again repeated to select an alternative target femtocell access point and associated UE. However, in this case, in the repeat, the selection process of FIG. 5 is performed excluding all possible handovers to that same target femtocell access point.

Moreover, in this latter case, that femtocell access point is excluded as a possible target for all handovers for a configurable predetermined time period.

If a handover of a particular UE from a first femtocell access point to a second femtocell access point is completed, as described above, the behaviour of that second femtocell access point is modified.

Specifically, if a handover of that same UE to the first femtocell access point appears to be necessary for mobility reasons (i.e. a conventional handover appears necessary), it is only allowed after a first timer has expired. However, a handover of that same UE to any other femtocell access point for mobility reasons is allowed. A handover of that UE to the first femtocell access point for load balancing reasons (i.e. in accordance with the procedure shown in FIG. 4, or similar) is only allowed after a second timer has expired. However, a handover of that same UE to any other femtocell access point for load balancing reasons is allowed. For any other UE, a handover to the first femtocell access point is only allowed after a timer has expired, although a third timer may be provided in respect of handovers for mobility reasons while a fourth timer may be provided in respect of handovers for load balancing reasons. Handovers of other UEs to other femtocell access points are not affected.

In some situation, a femtocell access point may be able to establish peer-to-peer communications with other femtocell access points in the group, for example as illustrated in FIG. 3 in which the femtocell access points are connected to a single local area network. In such cases, the selection of a target femtocell access point for a load balancing handover may be based on additional information provided by the other femtocell access points by means of such peer-to-peer communications.

Figure 6:
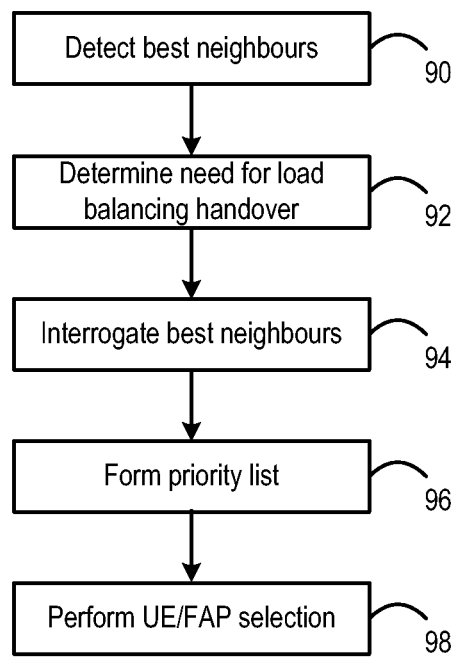

FIG. 6 illustrates a process using such additional information.

Step 90 of the process shown in FIG. 6 can advantageously be performed during normal operation of the originating femtocell access point. Specifically, it is known that the femtocell access point is able to enter a monitor mode, in which it can detect the signals transmitted by other base stations, including other femtocell access points, and in step 90 the femtocell access point detects the signals transmitted by other femtocell access points in the same group, and determines the best neighbours from the group. Specifically, by determining the neighbours with the best, e.g. strongest, signals, the femtocell access point is able to determine which of the neighbouring femtocell access points are likely to have the largest coverage overlap with it.

In step 92, it is determined in the originating femtocell access point that a load balancing handover is required, for example by determining that accepting a connection request would cause the number of active connections to exceed a threshold (which may be equal to or lower than the capacity of the femtocell access point), as described above with reference to FIG. 4.

In step 94, the originating femtocell access point interrogates all of the best neighbours on a peer-to-peer basis, in order to determine their current loading. Based on the received information, in step 96 the originating femtocell access point forms a priority list of the best neighbours, with the lowest loaded neighbour having the highest priority.

In step 98, the femtocell access point selects one of its connected UEs and an appropriate target femtocell access point to be the subject of a handover. This selection can be made by giving suitable weights to the loads of the candidate target femtocell access points, and to the signal qualities measured and reported by the candidate UEs, and selecting a UE and a femtocell access point on the basis of the resulting ranking.

In addition, the originating femtocell access point can take account of additional factors, such as whether the UEs are in compressed mode or non-compressed mode, and whether they are in packet-switched, circuit-switched or multi-RAB calls, either by giving suitable weights to such factors, or by selecting whenever possible a UE that meets one or more desirable criteria as regards such factors.

As mentioned above with regard to step 94, it is envisaged that the originating femtocell access point should interrogate all of its best neighbours, in order to determine their current loading, and should then form a priority list of the best neighbours based on that information. The rankings in the priority list can, in addition, or alternatively, be determined on the basis of historical information.

For example, a source femtocell access point might determine that many of its handovers to a particular target femtocell access point tend to create "ping-pong" effects, whereby the same UE is handed back to the original source femtocell access point after a relatively short time, either for mobility reasons or for load balancing reasons. In such a case, that target femtocell access point might be given a lower ranking in the priority list of best neighbours.

As another example, each femtocell access point might form one or more measures of its load on an ongoing basis. For example, it might monitor its average load, or the frequency of load spike periods when it is relatively highly loaded. These measures can be reported to the originating femtocell access point in step 94, and the originating femtocell access point can then take these factors into account when determining the ranking of each candidate target femtocell access point in the priority list of best neighbours.

As described so far, a femtocell access point sets a load threshold, which may be equal to its capacity or may be below its capacity, and takes steps to achieve load balancing when this threshold is reached.

As an alternative, multiple load thresholds may be set. For example, a higher load threshold may be set equal to the capacity of the femtocell access point, while a lower load threshold might be set at a lower load level. Then, in one embodiment of the invention, a load balancing handover might be initiated whenever the higher load threshold is reached (e.g. when it is not possible to accept a new connection request because the femtocell access point has already reached capacity), whereas a load balancing handover might also be initiated whenever the lower load threshold is reached and some additional criterion is met.

In one implementation of this, each femtocell access point continually monitors its load, and is able to communicate the load information to other femtocell access points in a peer-to-peer manner.

Figure 7:
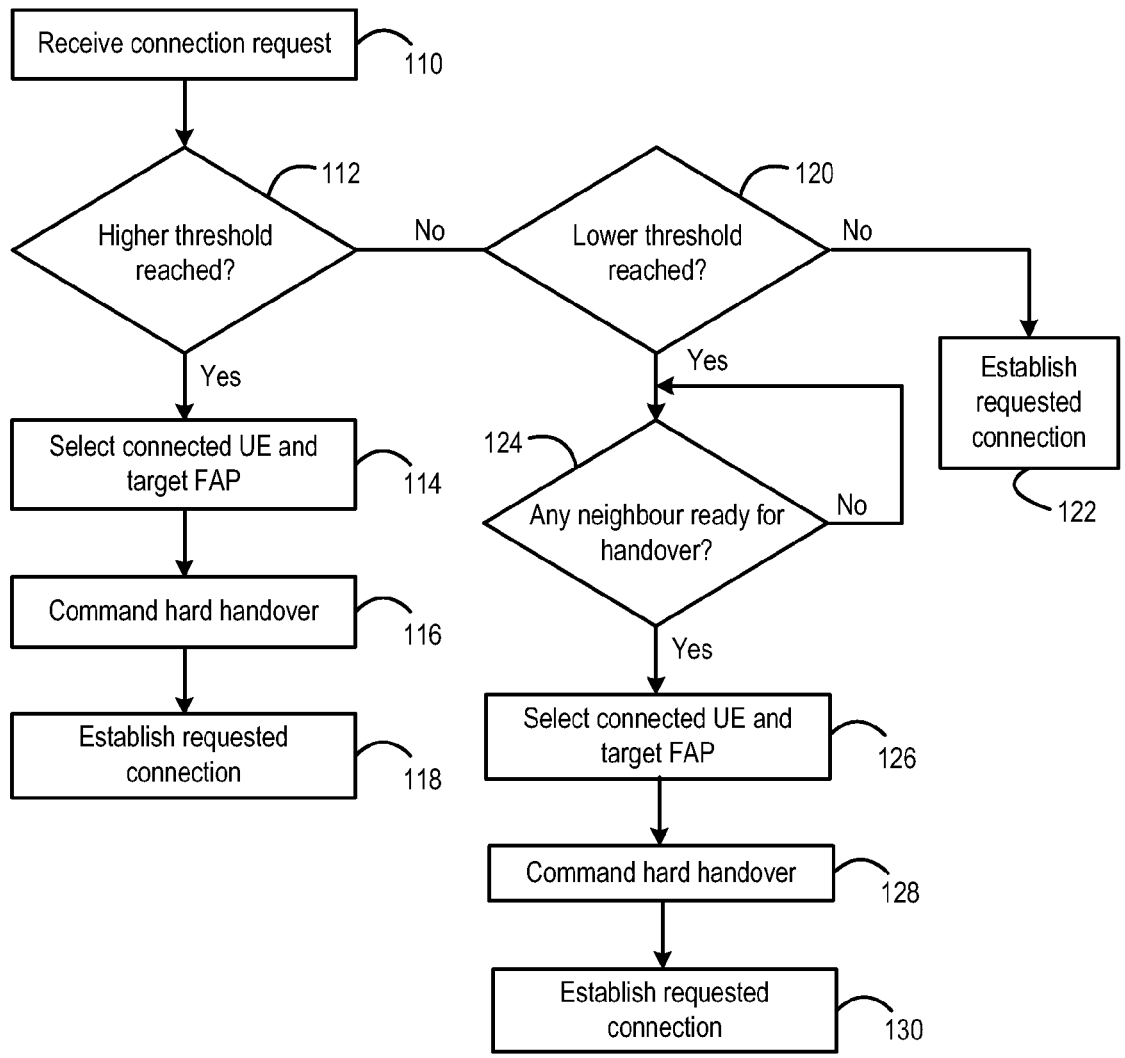

FIG. 7 is a flow chart illustrating a method in accordance with this aspect.

In step 110, the originating femtocell access point receives a new connection request, and in step 112 determines whether the higher load threshold has been reached. That is, in the case of a femtocell access point that can handle eight UEs simultaneously, it determines whether the new connection request would be the ninth connection. If the higher threshold has been reached, the process passes to step 114, and thereafter proceeds as described in connection with FIG. 4.

That is, in step 114 one of the connected UEs and a target femtocell access point are selected, on the basis of any of the information described previously. In step 116 a hard handover command is sent to the selected UE, indicating the selected target femtocell access point, and in step 118 the new requested connection is established.

If it is determined in step 112 that the higher load threshold has not been reached, the process passes to step 120, in which it is determined whether a lower load threshold has been reached. In the case of a femtocell access point that can handle eight UEs simultaneously, as described above, it may for example determine whether the new connection request would be the eighth connection. If it is determined in step 120 that the lower load threshold has not been reached, the process passes to step 122, and the requested connection is established. In this case, the load on the femtocell access point is deemed acceptable, and there is no action taken to balance the load on the femtocell access point with the load on any other femtocell access point.

If however it is determined in step 120 that the lower load threshold has been reached, the process passes to step 124, in which a proactive load balancing procedure is initiated. That is, a load balancing handover is performed in order to prevent the femtocell access point from reaching a condition where overload is imminent, but this load balancing handover is only performed if some other condition is met. Specifically, it is determined in step 124 whether any of the neighbour femtocell access points are ready for a handover.

In order to determine whether a femtocell access point is considered ready for a handover, each one determines its current load. For example, in the case of a femtocell access point that can handle eight UEs simultaneously, as described above, a femtocell access point with a current load of eight UEs is clearly unable to accept a handover of another UE. A femtocell access point with a current load of seven UEs is able to accept a handover of another UE, where this is necessary to prevent a call being lost, or where this femtocell access point is selected as the target femtocell access point in step 114 of the process, for example.

However, accepting a UE in this way will of course bring that femtocell access point to its capacity limit, making it unable to accept new connection requests without performing its own load balancing handover. A femtocell access point with a current load of seven UEs is therefore not considered ready for a handover when this test is applied in step 124. Rather, only femtocell access points with a current load of six UEs or fewer are considered ready for a handover.

If it is determined in step 124 that no neighbour is ready for a handover, each neighbour is interrogated every few seconds until it is determined that one or more of the neighbours is ready for a load balancing handover, and the process then passes to step 126.

In step 126 a neighbour femtocell access point that is ready for a handover is selected as the target femtocell access point and a suitable one of the connected UEs is also selected, on the basis of any of the information described previously. In step 128 a hard handover command is sent to the selected UE, indicating the selected target femtocell access point, and in step 130 the new requested connection is established.

Thus, information about the load status of each femtocell access point can be used to achieve load balancing, so that calls can be handled more efficiently.

The invention claimed is:

1. A method of operation of a cellular access point amongst a plurality of interconnected cellular access points, the method comprising:
   receiving from a first user equipment a connection attempt that, together with previously connected user equipments, would cause the access point to exceed a first predetermined capacity threshold;
   in response to receiving the connection attempt from the first user equipment, selecting one of the previously connected user equipments and an associated one of the plurality of interconnected cellular access points;
   in response to receiving the connection attempt from the first user equipment, initiating a handover of the selected one of the previously connected user equipments to the associated one of the plurality of interconnected cellular access points when an additional load balancing handover criterion is met; and
   after initiating the handover, establishing a connection with the first user equipment.

2. A method as claimed in claim 1, wherein the selection is performed based on measurement reports from previously connected user equipments.

3. A method as claimed in claim 1, wherein the selection is performed based only on measurement reports relating to access points of the plurality of interconnected cellular access points, and not on measurement reports relating to other base stations of the cellular network.

4. A method as claimed in claim 1, comprising: storing a list comprising at least one other access point of said plurality of interconnected cellular access points, and initiating a handover of the selected one of the previously connected user equipments to the associated one of the plurality of interconnected cellular access points only if the associated one of the plurality of interconnected cellular access points appears on the stored list.

5. A method as claimed in claim 1, comprising: when initiating the handover of the selected one of the previously connected user equipments to the associated one of the plurality of interconnected cellular access points, indicating that the handover is initiated for reasons of capacity.

6. A method as claimed in claim 1, wherein the first predetermined capacity threshold is equal to a maximum capacity of the access point.

7. A method as claimed in claim 1, wherein the first predetermined capacity threshold is less than a maximum capacity of the access point.

8. A method as claimed in claim 1, further comprising: receiving loading information from others of the plurality of interconnected cellular access points; and selecting one of the previously connected user equipments and an associated one of the plurality of interconnected cellular access points, based additionally on the received loading information.

9. A method as claimed in claim 1, wherein the step of selecting one of the previously connected user equipments comprises prioritising candidate connected users based on a reported measured quality of an existing connection to the associated one of the plurality of interconnected cellular access points.

10. A method as claimed in claim 1, wherein the step of selecting one of the previously connected user equipments comprises prioritising candidate connected users based on a type of service used by each of the candidate connected users.

11. A method as claimed in claim 1, wherein the step of selecting one of the previously connected user equipments comprises prioritising candidate connected users based on whether the candidate connected users provide inter-frequency or intra-frequency measurement reports.

12. A method as claimed in claim 1, wherein the step of selecting one of the previously connected user equipments and an associated one of the plurality of interconnected cellular access points comprises prioritising based on a current loading of candidate target access points.

13. A method as claimed in claim 1, wherein the step of selecting one of the previously connected user equipments and an associated one of the plurality of interconnected cellular access points comprises prioritising candidate target access points based on a history of handover success to that access point.

14. A method as claimed in claim 1, further comprising: receiving from a first user equipment a connection attempt that would cause the access point to exceed a second predetermined capacity threshold lower than the first predetermined capacity threshold.

15. A method as claimed in claim 14, wherein the additional load balancing handover criterion relates to the current load of the associated one of the plurality of interconnected cellular access points.

16. A method of operation of a cellular access point amongst a plurality of interconnected cellular access points, the method comprising:
   receiving from a first user equipment a connection attempt that, together with previously connected user equipments, would cause the access point to exceed a first predetermined capacity threshold;
   in response to receiving the connection attempt from the first user equipment, selecting one of the previously connected user equipments and an associated one of the plurality of interconnected cellular access points, the selection being made based on a likelihood that said one of the previously connected user equipments will be accepted for hand-in by said associated one of the plurality of interconnected cellular access points;

in response to receiving the connection attempt from the first user equipment, initiating a handover of the selected one of the previously connected user equipments to the associated one of the plurality of interconnected cellular access points when an additional load balancing handover criterion is met; and after initiating the handover, establishing a connection with the first user equipment.

17. A method as claimed in claim 16, wherein the selection is performed based on measurement reports from previously connected user equipments.

18. A method as claimed in claim 16, wherein the selection is performed based only on measurement reports relating to access points of the plurality of interconnected cellular access points, and not on measurement reports relating to other base stations of the cellular network.

19. A method as claimed in claim 16, further comprising:
receiving loading information from others of the plurality of interconnected cellular access points; and
selecting one of the previously connected user equipments and an associated one of the plurality of interconnected cellular access points, based additionally on the received loading information.

20. A method as claimed in claim 16, comprising receiving said loading information from others of the plurality of interconnected cellular access points by peer-to-peer communication.

21. A method as claimed in claim 16, wherein the step of selecting one of the previously connected user equipments comprises prioritising candidate connected users based on a reported measured quality of an existing connection to the associated one of the plurality of interconnected cellular access points.

22. A method as claimed in claim 16, wherein the step of selecting one of the previously connected user equipments comprises prioritising candidate connected users based on a type of service used by each of the candidate connected users.

23. A method as claimed in claim 16, wherein the step of selecting one of the previously connected user equipments comprises prioritising candidate connected users based on whether the candidate connected users provide inter-frequency or intra-frequency measurement reports.

24. A method as claimed in claim 16, wherein the step of selecting one of the previously connected user equipments and an associated one of the plurality of interconnected cellular access points comprises prioritising based on a current loading of candidate target access points.

25. A method as claimed in claim 16, wherein the step of selecting one of the previously connected user equipments and an associated one of the plurality of interconnected cellular access points comprises prioritising candidate target access points based on a history of handover success to that access point.

26. A method of operation of a cellular access point amongst a plurality of interconnected cellular access points, the method comprising:
receiving from a first user equipment a connection attempt that, together with previously connected user equipments, would cause the access point to exceed a first predetermined capacity threshold;
in response to receiving the connection attempt from the first user equipment, selecting one of the previously connected user equipments and an associated one of the plurality of interconnected cellular access points;
in response to receiving the connection attempt from the first user equipment, initiating a handover of the selected one of the previously connected user equipments to the associated one of the plurality of interconnected cellular access points when an additional load balancing handover criterion is met;
after initiating the handover, establishing a connection with the first user equipment; and
thereafter, allowing a handover of the selected one of the previously connected user equipments from the associated one of the plurality of interconnected cellular access points to said cellular access point only after a timer has expired.

27. A method as claimed in claim 26, wherein the first predetermined capacity threshold is less than a maximum capacity of the access point.

28. A method as claimed in claim 26, further comprising:
receiving from a first user equipment a connection attempt that would cause the access point to exceed a second predetermined capacity threshold lower than the first predetermined capacity threshold.

29. A method as claimed in claim 28, wherein the additional load balancing handover criterion relates to the current load of the associated one of the plurality of interconnected cellular access points.

* * * * *